UNITED STATES PATENT OFFICE.

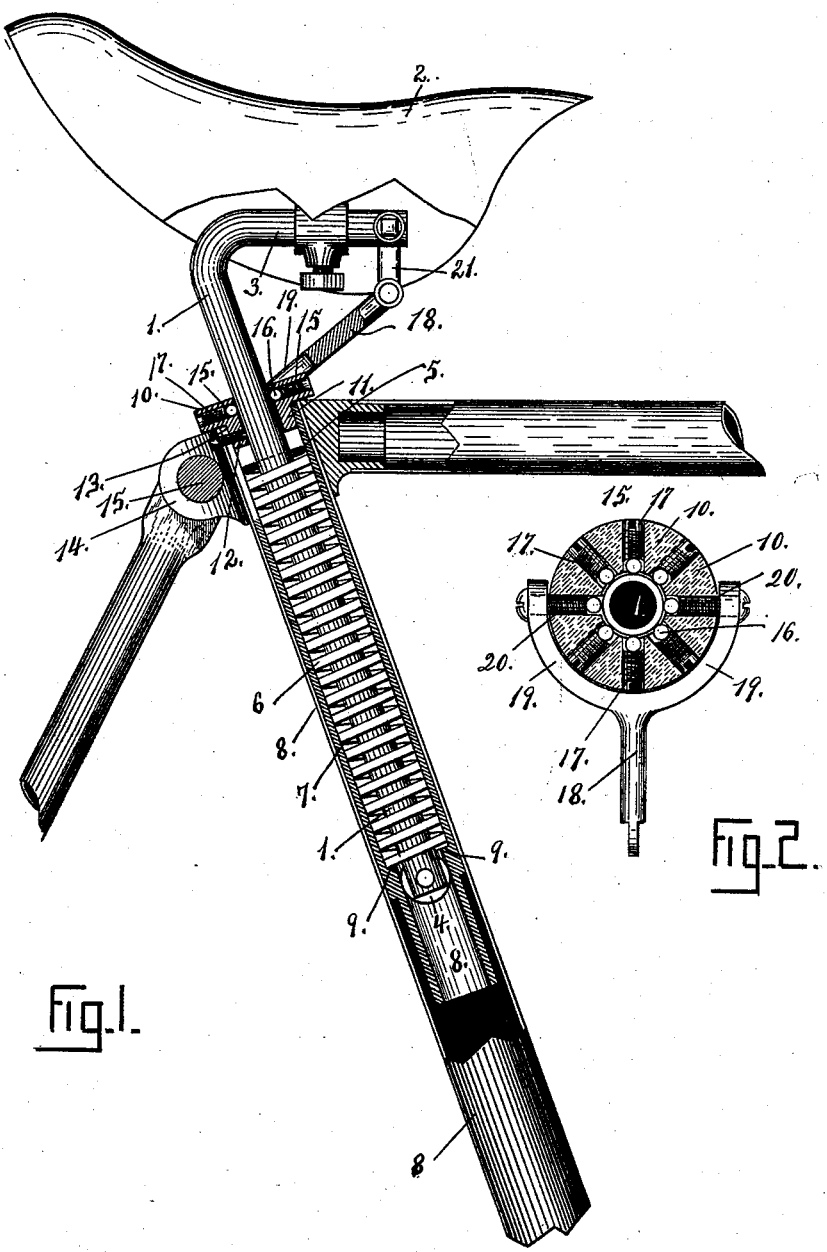

ALBERT H. HOLLAND, OF BUFFALO, NEW YORK.

SPRING-SEAT FOR VEHICLES.

SPECIFICATION forming part of Letters Patent No. 567,314, dated September 8, 1896.

Application filed December 6, 1895. Serial No. 571,204. (No model.)

*To all whom it may concern:*

Be it known that I, ALBERT H. HOLLAND, a citizen of the United States, residing at Buffalo, in the county of Erie and State of New York, have invented certain new and useful Improvements in Spring-Seats for Vehicles; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in spring-seats for vehicles, its object being to provide a spring-support of improved construction for single seats such as are placed upon cycles, cultivating and harvesting machines, and the like.

To that end my invention consists of a bar carrying the seat, a hollow casing vertically adjustable in the frame of the vehicle, and within which the seat-bar reciprocates, a socket in the hollow casing through which the seat-bar passes, ball-bearings in such socket, a spiral spring within the hollow casing, one end of which has a bearing contact with the seat-bar, the other end having a bearing contact with a fixture within the hollow casing, a flexible keeper having one end secured to a fixed portion of the hollow casing and the other end secured to the reciprocating seat-bar, and a friction-wheel journaled in the lower end of the seat-bar and having rolling contact within the hollow casing.

In the drawings, Figure 1 is a side elevation, partly in section, of my improved spring-seat and a fragmentary portion of a bicycle-frame to which the seat is attached; and Fig. 2 is a sectional view taken in the line $x\,x$ of Fig. 1.

Referring to the drawings, it will be seen that by way of illustration I have shown my invention as applied to a bicycle, although I intend it to be equally applicable to a single seat adapted for use not only upon a bicycle, but upon cultivators, harvesters, or other analogous vehicles or machines where it is desirable to break the jar produced by passing over uneven surfaces.

1 is the seat-bar, carrying the bicycle seat or saddle 2 upon its forwardly-projecting arm 3. The seat-bar 1 is preferably cylindrical and has the friction-wheel 4 journaled in its lower end. A removable pin 5 rests in an aperture extending entirely across the bar, the projecting ends of the pin 5 forming a bearing for the upper end of the spiral spring 6, which surrounds the seat-bar. 7 is a hollow cylindrical casing, which is adjustable vertically within the tube 8, forming a part of the frame of the bicycle. The lower portion 8' of this casing 7 is of smaller diameter than the main body of the casing and is adapted for the reception of the friction-wheel 4 upon the lower end of the seat-bar 1, the wheel having rolling contact within the same. The annular shoulder 9, which is formed at the lower end of the casing 7, forms a bearing for the lower end of the spiral spring 6.

10 is a socket having the reduced portion 11, which fits snugly within the upper end of the casing 7 and to which it is removably secured by the screw 12, which passes through the wall of the casing 7 and the depending flange 11.

An open slot 13 in the upper end of the tube 8, with apertured lugs 14 on each side thereof adapted for the reception of the bolt 15, serves as a clamping device for securing the casing 7 in position and at the same time allows the casing to be drawn up out of the tube 8 to adjust the seat-bar to a higher position in the frame, said bar being rigidly secured in any of its positions by the clamping-bolt 14. The socket 10 has arranged around its circumference a series of radial chambers 15, in the inner open end of which are placed the balls 16, which are of a sufficient size to fit these chambers snugly, but loosely. These balls 16 are held in rolling contact with the seat-bar 1 by the screws 17, having convex inner ends 17', against which they bear and with which they can be adjusted in position toward the seat-bar 1 as they wear away through friction. I have herein shown eight of these friction-balls 16, but a less number could be employed if desired. The preferred form of flexible keeper which I employ is a toggle-lever, which consists of the rod 18, provided at one end with the yoke 19, having two arms which partially surround and are pivoted to the socket 10 by the screws 20 20, which may also serve to hold and adjust friction-balls, as shown. The other end of rod 18 is pivoted to one end of the rod 21 in any desired manner. The upper end of this rod 21 is in turn pivoted to the outer end of the forwardly-extending arm 3 of the seat-bar 1. This keeper being thus jointed, and thereby flexible, permits of the vertical play of the seat-bar, prevents its turning in its socket, and at the same time does not allow of its being forcibly expelled from the socket in which it plays.

In operation, as the seat-bar is forced downwardly under the weight of the rider and upwardly by the reflex action of the spring 6, the friction-balls 16 in the socket 10 and the friction-wheel 4 in the portion 8 of the casing 7 permit of an easy play of the seat-bar.

The jointed keeper or toggle-lever 18 21 might be replaced by a bent flexible metallic strip, but I prefer the form shown as being more reliable in action.

The spiral spring 21 is to be made of lighter or heavier material, according to the weight of the rider.

My improved spring-seat is well adapted for use with cushion-tires, and it will ride easier than stationary seats with pneumatic tires.

I claim—

1. In a spring-seat for vehicles, the combination with a tubular frame, a tubular casing adjustably secured therein, a shoulder on the inside of said casing near its lower end, a seat-bar passing through the casing, a cross-pin therein, and a spiral spring surrounding said bar one end resting on the shoulder and the other end against said pin; of a bearing removably held at the upper end of the casing, and a toggle-lever pivotally connected to the upper end of the seat-bar and to said bearing substantially as described.

2. A spring-seat for vehicles consisting of a seat-bar, a hollow casing vertically adjusted in the frame of the vehicle and within which the seat-bar reciprocates, a shoulder within said casing, a socket removably secured in said casing and provided with ball-bearings through which the bar passes, a spiral spring within the hollow casing one end of which has a bearing contact with the seat-bar, the other resting against the shoulder, and a flexible keeper having one end connected with the seat-bar and the other provided with a yoke, and screws passing through said yoke and into the socket and whose ends rest against two of the balls within the socket, substantially as and for the purpose set forth.

3. In a spring-seat for vehicles, the combination with a frame, a casing secured therein and provided with an inwardly-extending shoulder near its lower end, a spring within the casing resting against said shoulder, a socket secured to the upper end of the casing, a seat-bar having one end bent forward and the other passing through the socket and spring, and a cross-pin in said bar at the upper end of the spring; of a toggle-lever one end of which is connected with the seat-bar and the other end provided with a yoke which partially surrounds and is pivoted to the socket, as and for the purpose set forth.

In testimony whereof I have signed my name to this specification in the presence of two subscribing witnesses.

ALBERT H. HOLLAND.

Witnesses:
  W. T. MILLER,
  T. P. KUSTEN.